United States Patent [19]
Petersen

[11] 3,973,400
[45] Aug. 10, 1976

[54] HYDROSTATIC TRANSMISSION
[75] Inventor: Donald Dean Petersen, Cedar Falls, Iowa
[73] Assignee: Deere & Company, Moline, Ill.
[22] Filed: Sept. 4, 1975
[21] Appl. No.: 610,233

[52] U.S. Cl. .................................. 60/465; 60/487; 60/489
[51] Int. Cl.² ........................................ F15B 15/18
[58] Field of Search ............ 60/464, 465, 487, 488, 60/489, 493

[56] References Cited
UNITED STATES PATENTS

| | | | |
|---|---|---|---|
| 3,188,810 | 6/1965 | Kuze | 60/444 |
| 3,360,933 | 1/1968 | Swanson et al. | 60/464 |
| 3,376,703 | 4/1968 | Buczynski | 60/399 |
| 3,390,523 | 7/1968 | Heidemann et al. | 60/389 |
| 3,398,531 | 8/1968 | Swanson et al. | 60/466 |
| 3,667,226 | 6/1972 | Asmus et al. | 60/489 |
| 3,675,421 | 7/1972 | Asmus | 60/465 |
| 3,699,677 | 10/1972 | Asmus | 60/489 |
| 3,699,678 | 10/1972 | Swanson et al. | 60/489 |

*Primary Examiner*—Edgar W. Geoghegan

[57] ABSTRACT

The hydrostatic transmission includes a main pump having a plurality of reciprocating pistons projecting into and biased towards a drive chamber and has both its inlet and its drive chamber connected to a substantially constant pressure charge circuit. Displacement of the pump is controlled by controlling the fluid flowing from the charge circuit to the inlet. The pump outlet is connected to the drive chamber through a combined safety and inching valve which normally blocks fluid flow therebetween but which is responsive to excess pressure at the pump outlet to open and increase the pressure in the drive chamber. The valve is also manually operable through a pedal on the vehicle which can be used to destroke the pump in emergency situations or to provide inching control.

7 Claims, 2 Drawing Figures

HYDROSTATIC TRANSMISSION

CROSS REFERENCE TO RELATED APPLICATIONS

This application discloses subject matter also disclosed in copending applications Ser. No. 610,234 and 610,232 filed concurrently herewith and relates to improvements in the transmission disclosed and claimed in copending application Ser. No. 610,234.

BACKGROUND OF THE INVENTION

The present invention relates generally to the art of hydrostatic transmissions and more particularly relates to improvements in the control of a pump for a hydrostatic transmission.

In the typical hydrostatic transmission utilized for a vehicle drive, the driving speed of the transmission is varied by controlling the displacement of the pump of the transmission. In this type of transmission the pressure delivered by the pump is not directly controlled, but is a function of the load on the vehicle. The displacement of the pump is normally controlled through some mechanical linkage which, to a certain extent, will simulate a vehicle throttle. That is, the mechanical linkage can either be hand or foot operated to increase or decrease the transfer speed of the transmission. With such a transmission it is often desirable, particularly when displacement is controlled through a hand lever, to have an additional control which will override the main control and which is operated through a pedal so that in an emergency situation the operator's natural tendency to depress a clutch or brake pedal will operate the additional control and bring the hydrostatic transmission into a neutral condition. Such a control also provides a convenient method of controlling the transmission when small movements are required such as when attempting to hook an agricultural tractor to an implement. This control of the transmission to provide small increments of movement of the vehicle is generally referred to as an inching control. In a typical hydrostatic transmission such a secondary control merely dumps fluid pressure from the pressure line between the transmission pump and motor to a charge circuit or reservoir or to the return line between the pump or motor so that the fluid pressure in the pressure line between the pump or motor is reduced to a value substantially equal to the value of the pressure in the return line between the pump and motor.

It is also desirable in the hydrostatic transmission to limit the maximum pressure of the fluid delivered to the pump. This is generally accomplished by providing a pressure relief valve in the pressure line between the pump and motor which is responsive to a predetermined maximum pressure to drain excess fluid to a reservoir or charge circuit or to the return line between the motor and pump. While such an arrangement does limit maximum pressure, it does not in any way cure the condition creating the maximum pressure and hence results in power loss due to heat generation.

SUMMARY OF THE INVENTION

The principal object of the present invention is to provide a hydrostatic transmission in which the pump has a plurality of reciprocating pistons projecting into a drive chamber, in which the pump displacement is normally controlled by controlling the fluid flowing to the pump, and in which additional controls are provided which affect the displacement of the pump by routing fluid from the pressure line between the pump and motor to the drive chamber of the pump to hold the pistons away from the piston drive member within the pump.

The above object and additional objects and advantages of the present invention will become apparent to those skilled in the art from a reading of the following detailed description taken in conjunction with the accompanying drawing.

DESCRIPTION OF THE PREFERRED EMBODIMENT

Figure 1:
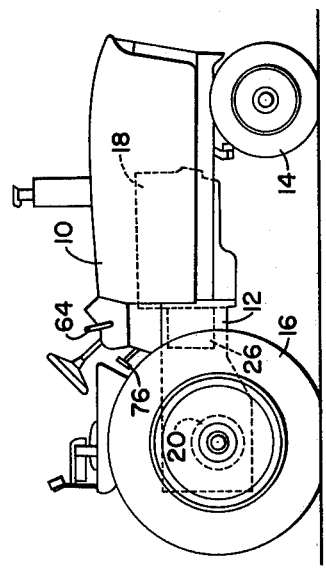
FIG. 1 is a side elevational view of a vehicle incorporating a transmission according to the present invention.

Referring now to the drawing, a hydrostatic transmission constructed in accordance with the principles of the present invention is, for illustration purposes only, indicated as part of an agricultural tractor 10 which includes a main frame 12, a pair of front steerable wheels 14, a pair of rear traction wheels 16 and an engine 18. The transmission itself includes one or more drive motors 20 drivingly coupled to the rear traction wheels 16 of the tractor 10, a charge pump 22 and a main pump indicated generally at 24. The pumps 22 and 24 are indicated collectively at 26 in FIG. 1 and are illustrated as being coupled directly to the engine 18.

The inlet port of the charge pump 22 is connected to a source of fluid or fluid reservoir 28 through a fluid line 30 and the discharge port of the charge pump 22 is connected to a charge circuit which includes fluid lines 32, 34, 36, and 38. A relief type pressure regulating valve 40 is connected to the fluid line 34 and maintains a substantially constant pressure within the charge circuit.

The main pump 24 includes a cylinder barrel 41 which has a plurality of cylinders 42 provided therein and open to a common drive chamber 44. A piston 46 is reciprocally mounted in each cylinder 42, projects into the drive chamber 44 and is biased toward the drive chamber 44 by a spring 48. A drive shaft 50 for the pump 24 is journaled in the cylinder barrel 41 and a circular cam 52 is eccentrically mounted on the drive shaft 50 within the drive chamber 44 for rotation with the shaft 50 to engage the pistons 46 and drive the same outwardly. The shaft 50 can be coupled directly to the drive shaft of the engine 18 of the tractor 10.

Each of the cylinders 42 of the main pump 24 is connected to an inlet port represented by the fluid line 54 through a check valve 56, and is also connected to a discharge port represented by the fluid line 58 through a one-way valve 60.

The inlet port 54 of the main pump 24 is connected to the fluid line 32 of the charge circuit through a main control valve 62 which is adapted to be operated by movement of a hand lever 64. Although only schematically illustrated, the valve 62 may take exactly the same form as the main control valve illustrated in the above-mentioned copending application Ser. No. 610,234. The discharge port 58 of the main pump 24 is connected to the inlet port of the motor 20 through a directional control valve 66. The discharge port of the motor 20 is connected to the fluid line 38 of the charge circuit through the directional control valve 66. The directional control valve 66 provides forward and reverse direction of operation of the transmission by reversing the direction of fluid flow through the motor 20.

The drive chamber 44 of the main pump 24 is also connected to the charge circuit through a fluid passage 68, a fluid line 70 and a spring loaded check valve 72. The spring loaded check valve 72 prevents flow of fluid from the drive chamber 44 to the charge circuit and, due to its spring loading reduces the pressure of fluid flowing from the charge circuit to the drive chamber to a value where the force exerted on the pistons 46 by fluid pressure within the drive chamber is equal to the force exerted on the pistons 46 by the springs 48 when the pistons 46 are at the outer ends of their strokes. The drive chamber 44 is also connected to the fluid reservoir 28 through a restricted passage 74. The restricted passage 74 provides some circulation of fluid through the drive chamber 44 for cooling purposes and also relieves excess pressure from the drive chamber.

The discharge port of the main pump 24 is also connected to the drive chamber 44 by fluid line 75 extending between the discharge port and the fluid line 70. A pressure relief valve 78 is interposed in the fluid line 75 and is normally biased to a closed position by spring 80. The valve 78 is responsive to fluid pressure at the discharge port through a pilot line 82 to move to an open fluid passing position when the fluid pressure in the discharge port 58 reaches a predetermined maximum value. The biasing force of the spring 80 can also be mechanically overridden through the use of a pedal 76 which permits the operator to selectively open the valve 78.

OPERATION

Figure 2:
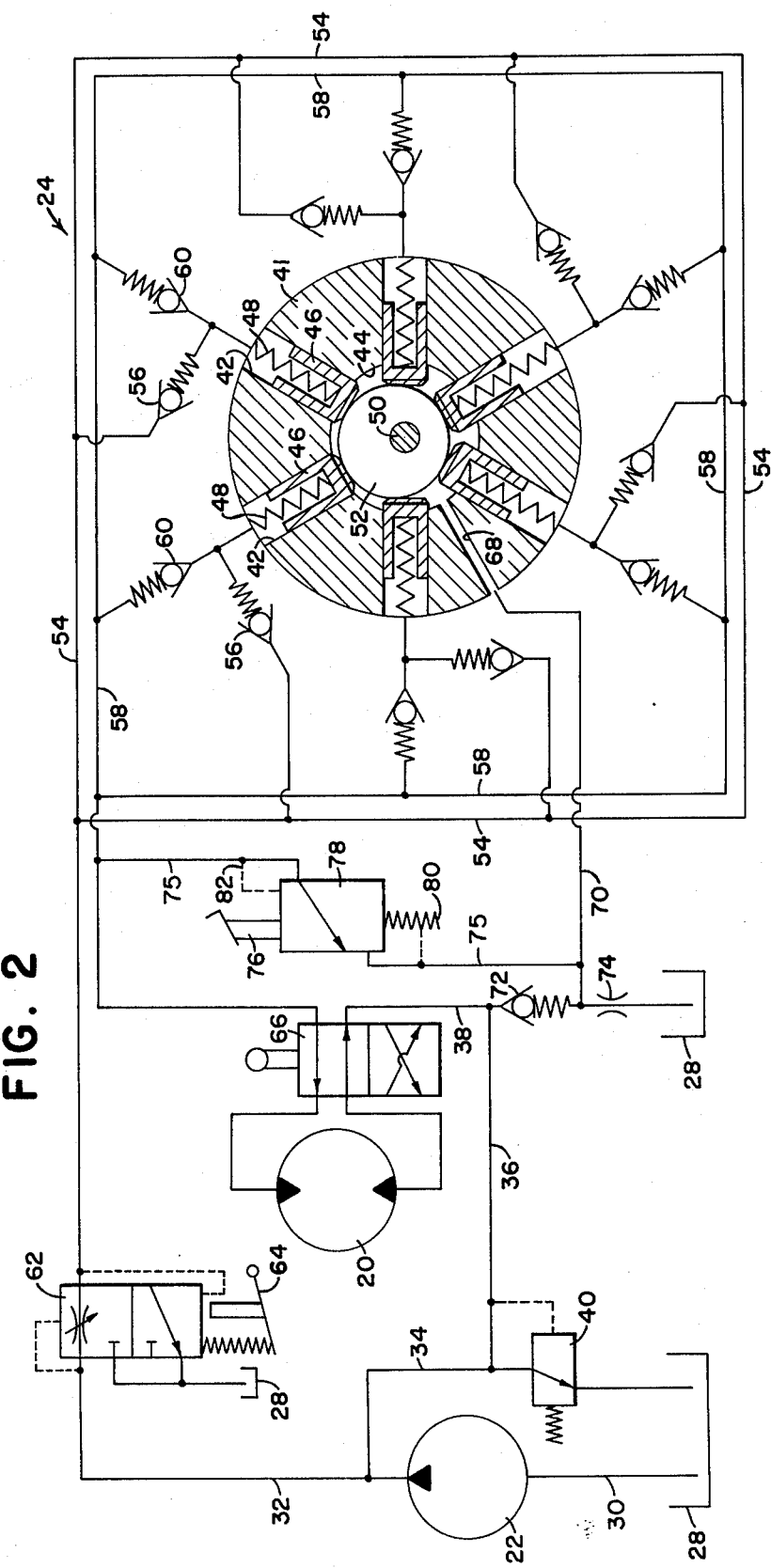
FIG. 2 is a schematic illustration of a hydrostatic transmission constructed in accordance with the principles of the present invention.

Assuming the engine 18 is running and the valve 62 is closed (the valve 62 is shown in the open position in FIG. 2), the cam 52 drives the pistons 46 to the outer ends of their stroke and the pump 22 pressurizes the charge circuit to the pressure determined by the relief valve 40. Pressure within the charge circuit will flow across the check valve 72 through the fluid line 70 and fluid passage 68 to pressurize the drive chamber 44. The pressure within the drive chamber exerts a force on pistons 46 which balances against the force exerted by the springs 48 so that the pistons 46 remain at the outer ends of their stroke. Fluid leaking from the drive chamber 44 through the restricted bleed passage 74 is continually made up by additional flow across the check valve 72 and provides some cooling for the fluid in the drive chamber 44. With the pistons 46 held at the outer ends of their stroke, the main pump 24 is in a stand-by, zero stroke or zero displacement condition.

The operator of the tractor 10 can bring the main pump 24 into stroke by movement of the valve 62 through the use of control level 64. As the valve 62 is opened it first controls the quantity of fluid flowing to the inlet 54 of the main pump and then controls the pressure of the fluid flowing to the inlet of the main pump 24. For a fuller description of the operation of the main control valve 62 reference should be had to copending application Ser. No. 610,234. As fluid flows to the inlet 54 of the main pump 24 it will flow across the check valves 56 to the cylinders 42. Pressure of the fluid flowing to the cylinders 42 will act on the pistons 46 to create an imbalance of the forces thereon so that the pistons 42 are moved inwardly. The cam 52 will then again drive the pistons outwardly to discharge fluid through the check valves 60 and outlet port 58 to the motor 20 by way of the direction control valve 66.

If the load on the tractor 10 increases such as when the tractor travels up hill or is pulling a ground working implement, the pressure in the outlet port 58 of the main pump increases due to the increased load on the motor 20. If the pressure in the outlet port 58 reaches a predetermined maximum value, a preselected value below the pressure at which components of the transmission would fail, this pressure, acting through the pilot line 82, will move the valve 78 to an open fluid passing position so that the high pressure from the outlet port 58 is routed to the drive chamber 44. The high pressure in the drive chamber 44 will hold the pistons at the outer ends of their stroke to reduce the displacement of the pump or bring the displacement of the pump to zero so that the system is not continually subjected to the high pressure. During this period there is very little power loss inasmuch as the pump displacement is decreased rather than dumping full pump displacement to the reservoir 28 or to the charge circuit. In such a condition the operator will have to correct or overcome the cause of the high resistance before continuing normal operation. This may be done simply by reversing the direction of tractor movement through the use of directional control valve 66. When the pressure in the main pump outlet 58 is reduced the valve 78 will return to its closed position and the excess pressure in the chamber 44 will be bled through the restricted bleed passage 74 until the pressure in the drive chamber 44 again reaches the generally constant pressure established by the pressure of the charge circuit and check valve 72.

The operator can also control movement of the tractor 10 through the use of the pedal 76 rather than through the use of a control lever 64. For example, by depressing the pedal 76 the operator can open the valve 78 to dump the main pump discharge to the drive chamber 44. The operator can then open the valve 62 to the desired position through movement of the lever 64 without affecting any movement of the tractor. Then, by gradually releasing the pedal 76 the main pump outlet 58 is gradually disconnected from the drive chamber 44 and excess pressure within the drive chamber 44 is gradually exhausted through the restricted bleed passage 74 so that the pump 24 starts to deliver fluid to the motor 20. Movement of the vehicle can be quickly stopped by again depressing the pedal 76. In this manner the operator can effect smooth, small movements of the vehicle 10. This type of control of a tractor, inching control, is very useful when maneuvering the tractor in tight quarters or when attempting to hook an implement to the tractor.

Operation of the valve 78 through the pedal 76 also provides a convenient emergency control. For example, if it becomes necessary to stop movement of the tractor when the operator is busy with not only steering a tractor but also in controlling other functions, it is very difficult to close the valve 62 through the use of a hand lever 64. However, the pedal 76 is available to stop the tractor until such time as the operator is free to close the valve 62.

Having thus described the preferred embodiment of the invention various modifications and improvements within the spirit and scope of the invention will become apparent to those skilled in the art and can be made without departing from the underlying principles of the invention. Therefore, the invention should not be limited to a specific illustration and description of a single preferred embodiment, but only by the following claims.

I claim:

1. In a hydrostatic transmission including a pump having a plurality of reciprocating pistons projecting into a drive chamber, a supply of fluid for the pump, means for controlling the displacement of the pump by controlling the fluid flowing to the pump, a hydraulic motor, and hydraulic circuit means interconnecting the pump and motor and including means for controlling the direction of fluid flow through the motor, a combined inching and safety circuit comprising: fluid line means interconnecting the pump outlet and the drive chamber; valve means interposed in the fluid line means normally biased to a closed position and responsive to a predetermined fluid pressure at the pump output to open; and manually operable means associated with the valve means to overcome the bias and open the valve means.

2. The invention as set forth in claim 1 wherein a restricted bleed line interconnects the pump drive chamber and a fluid reservoir.

3. The invention as set forth in claim 2 wherein the manually operable means includes a pedal operatively associated with the valve means to move the valve means to an open position upon movement of the pedal.

4. In a hydrostatic transmission including a charge pump, a source of fluid for the charge pump, a main variable displacement pump having a plurality of reciprocating pistons projecting into a drive chamber and biased toward the drive chamber, inlet and outlet ports for the main pump, a motor having inlet and outlet ports, charge circuit means connecting the charge pump to the inlet and drive chamber of the main pump and the motor outlet port for maintaining a substantially constant pressure in the charge circuit, means interconnecting the main pump outlet port and motor inlet port, and manually operable means for controlling the displacement of the main pump by controlling the fluid flowing from the charge circuit to the main pump inlet port, a combined inching and safety circuit comprising: one way valve means in the connection between the charge circuit and drive chamber preventing fluid flow from the drive chamber to the charge circuit; fluid line means interconnecting the main pump outlet port and the drive chamber; valve means interposed in the fluid line means normally biased to a closed fluid blocking position responsive to a predetermined maximum fluid pressure at the main pump outlet port to move to an open fluid passing position; manually operable means associated with the valve means to selectively manually overcome the bias and move the valve means to an open position; and restricted bleed means interconnecting the drive chamber and the source of fluid.

5. In combination with a vehicle having an engine and drive wheels, a hydrostatic transmission coupling the engine and drive wheels comprising: a charge pump driven by the engine and having inlet and outlet ports; a source of fluid connected to the charge pump inlet; a charge circuit connected to the charge pump outlet port and including means for maintaining a substantially constant pressure therein; a main variable displacement pump having a plurality of reciprocating pistons projecting into and biased toward a drive chamber; piston drive means mounted within the drive chamber and driven by the engine; inlet and outlet ports for the main pump; means interconnecting the charge circuit and the drive chamber and including means preventing fluid flow from the drive chamber to the charge circuit; means interconnecting the charge circuit and main pump inlet port and including manually controlled means for controlling the displacement of the main pump by controlling the fluid flowing from the charge circuit to the main pump inlet port; hydraulic motor means drivingly coupled to the drive wheels and including inlet and outlet ports connected to the main pump outlet port and the charge circuit, respectively; hydraulic circuit means interconnecting the main pump outlet port and the drive chamber and including valve means normally biased to a fluid blocking position responsive to a predetermined fluid pressure at the main pump outlet port to move to a fluid passing position; and a restricted bleed line connecting the drive chamber and the source of fluid.

6. A hydrostatic transmission as set forth in claim 5 wherein manually controlled means are associated with the valve means to selectively override the bias on the valve means and move the valve means to its fluid passing position.

7. A hydrostatic transmission as set forth in claim 6 wherein the last mentioned manually controlled means includes a pedal mounted on the vehicle for operation by the operator of the vehicle.

* * * * *